United States Patent [19]
Eli Brookner

[11] 3,787,853

[45] Jan. 22, 1974

[54] CODED MULTIPLE FREQUENCY SIGNAL SYSTEM

[75] Inventor: Eli Brookner, Lexington, Mass.

[73] Assignee: Raytheon Company, Lexington, Mass.

[22] Filed: Mar. 31, 1967

[21] Appl. No.: 628,252

[52] U.S. Cl..................... 343/8, 343/9, 343/17.2 R
[51] Int. Cl............................................... G01s 9/23
[58] Field of Search..................... 343/7.7, 8, 17.2 R

[56] References Cited
UNITED STATES PATENTS

| | | | |
|---|---|---|---|
| 3,302,162 | 1/1967 | Rowlands | 343/7.7 X |
| 3,309,700 | 3/1967 | Garrison | 343/17.2 X |

Primary Examiner—T. H. Tubbesing
Attorney, Agent, or Firm—Harold A. Murphy; Joseph D. Pannone

[57] ABSTRACT

A Doppler radar system comprising a transmitter beaming coded multiple frequency signals and a receiver comprising a plurality of filter means each having a different frequency transfer characteristic and responsive to a different narrow band of echo signals. The simultaneous frequency signals or tones are coded such that the frequency difference between any two frequencies is unequal to the frequency difference between any other two frequencies. The filter means produce a plurality of tones each representing a different Doppler shift. The receiver further comprises a summing network for generating a signal indicative of range and Doppler shift.

6 Claims, 11 Drawing Figures

DOWN $20 \log_{10} 1/2N$ ON THE AVERAGE OVER THE INTERVAL FROM $-T$ TO $T$

INVENTOR
ELI BROOKNER
BY Carole M. Colman
ATTORNEY

INVENTOR
ELI BROOKNER
BY Carole M. Calman
ATTORNEY 3,787,853

CODED MULTIPLE FREQUENCY SIGNAL SYSTEM

The invention subsequently described was made under a Contract AF 30(602) 2864 with the Department of the Air Force.

BACKGROUND OF THE INVENTION

1. Field of the Invention

This invention is concerned with signal processing systems and particularly with radar systems.

2. Description of the Prior Art

Prior art continuous wave radar systems have a comparatively low clutter rejection capability which, of course, interferes with their determination of valid targets. Also, they often provide ambiguous range and velocity measurements, and those having large bandwidths are extremely complex.

SUMMARY OF THE INVENTION

The invention comprises a system for processing coded multiple frequency signals and includes a generator and a receiver. The generator includes a gate connected between a cosine generator and an amplitude modulator; a single phase modulator connected in parallel with a plurality of phase shifters; each one of this plurality being connected to a different upper sideband modulator; a summer connected to each of the upper sideband modulators; and, a power amplifier connected to the summer. The receiver includes a plurality of circuits, each having a plurality of phase shifters connected in parallel; a plurality of matched filters each connected to one of the phase shifters; and, a summer connected to the matched filters. Another signal receiver implementation replaces the plurality of filters with a coherent memory filter and a tapped delay line.

DESCRIPTION OF THE PREFERRED EMBODIMENT

Figure 1:
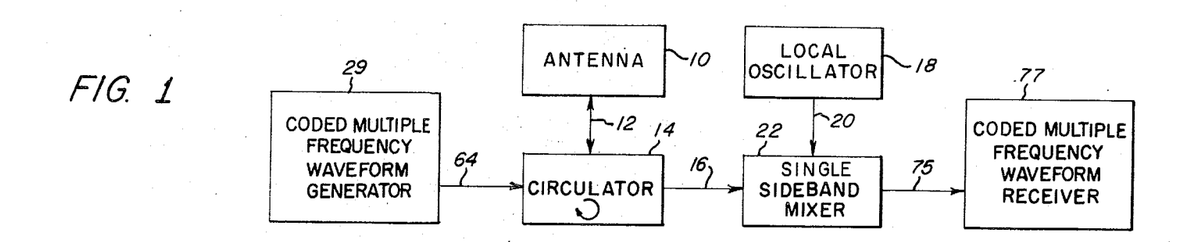
FIG. 1 is a block diagram of an inventive pulse radar system.

An inventive pulse radar system is shown in FIG. 1 and comprises circulator 14 connected to antenna 10 and coded multiple frequency waveform generator 29; and, single sideband mixer 22 connected to circulator 14, local oscillator 18, and coded multiple frequency waveform receiver 77. During transmit operation, coded multiple frequency waveform generator 29 applies coded multiple frequency signals to circulator 14 via line 64. Circulator 14 then transmits these signals to antenna 10 over line 12. Antenna 10 propagates the signals into space.

During receive operation, antenna 10 transfers signals to circulator 14 which then applies them to single sideband mixer 22 via line 16. Local oscillator 18 generates a signal $b \sin (2\pi f_s t)$. The outputs of circulator 14 and local oscillator 18 are next mixed in single sideband mixer 22 which transmits the following to coded multiple frequency waveform receiver 77 via line 75:

$$A a(t) \sum_{i=1}^{N} \sin [2\pi f_e t + 2\pi (f_i + f_\theta)(t - \tau) + \theta(t) + \theta_i + \phi] \quad (1)$$

where A = voltage proportional to target cross section
$f_e = f_o - f_s$
$\tau$ = round trip propagation time
$\phi$ = random phase which depends on the range of the target Coded multiple frequency waveform generator 29 and coded multiple frequency waveform receiver 77 will now be described in detail.

Figure 2:
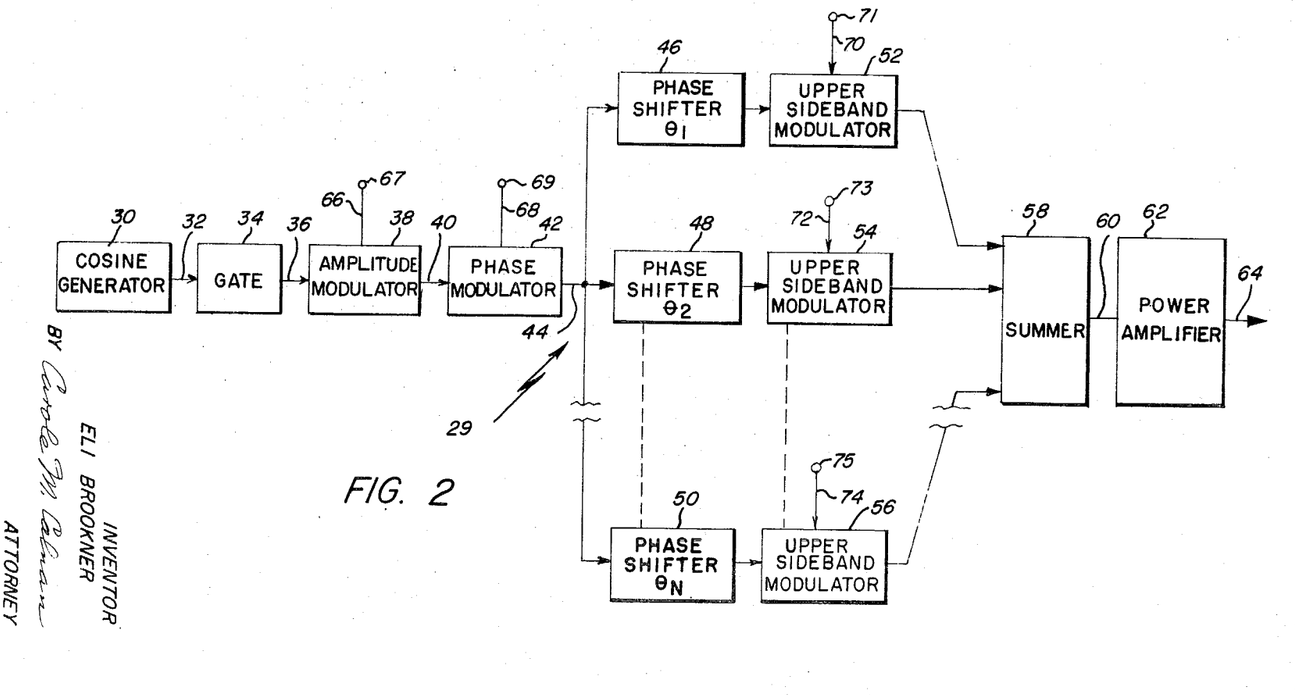
FIG. 2 is a block diagram of a coded multiple frequency waveform generator.

A coded multiple frequency waveform generator is shown in FIG. 2 and comprises to gate 34 connected between cosine generator 30 and amplitude modulator 38; phase modulator 42 connected to amplitude modulator 38; phase shifter 46 connected between phase modulator 42 and upper sideband modulator 52; phase shifter 48 connected between phase modulator 42 and upper sideband modulator 54; phase shifter 50 connected between phase modulator 42 and upper sideband modulator 56; summer 58 connected to upper sideband modulator 52, upper sideband modulator 54, and upper sideband modulator 56; and, power amplifier 62 connected to summer 58.

A coded multiple frequency signal comprises the superposition of N radio-frequency pulses, all of which have the same amplitude and phase modulators but differing carrier frequencies. All of these radio-frequency pulses begin and end at the same time. In other words, they are time coincident. Hence, the signal waveform is generated by the simultaneous transmission of a plurality of pulsed frequency tones with all of the pulsed frequency tones having the same amplitude and phase modulation. The equation for this signal is:

$$s(t) = a(t) \sum_{i=1}^{N} \cos (2\pi f_0 t + 2\pi f_i t + \theta(t) + \theta_i)$$

for $0 \leq t \leq T$
$s(t) = 0$ otherwise  (2)

where $a(t)$ is the amplitude modulation for each radio-frequency pulse; $\theta(t)$ is the phase modulation; $f_o$ is the radio frequency carrier frequency; $f_i$ is the frequency of the $i$th radio-frequency pulse measured relative to the radio-frequency carrier frequency $f_o$; and $\theta_i$ is an arbitrary phase shift which is different for each pulse tone.

A unique feature of the coded multiple frequency signal is due to the fact that the carrier frequencies of the radio-frequency pulses are chosen so as to be not equally spaced. A variety of spacings or codings can be used, and a few examples will be given later. The choice of a frequency coding depends on the particular application for which the waveform is intended. In equation 2, the coding is represented by $f_i$, and each tone has a frequency $f_o + f_i$.

The time waveform of a coded multiple-frequency signal is noise-like in appearance. Because of this, power amplifier 62 must be operated linearly since it is located after summer 58. This is in contrast to existing waveform generators which were chosen so as to permit their power amplifiers to be operated in a saturated condition in order to achieve maximum transmitter efficiency. It has been found that the use of travelling-wave tubes in power amplifier 62 provides the necessary linear operation.

The phases of the various pulses of the coded multiple frequency signal are specified to be pseudo-random. This is done in order to reduce the peak to rms voltage of the transmitted signal so as to realize maximum transmitter efficiency. If the pulse phases were made equal to zero, the radio-frequency pulses of one signal would all add up to give a signal having a voltage which is equal to N times that of one radio-frequency pulse.

If the power amplification were to be performed prior to summer 58 by a power amplifier in each input line of summer 58 and if no amplitude modulation is provided by an amplitude modulator 38, the phase shifters 46, 48, and 50 may be omitted and power amplifier 62 can be operated in a saturated condition to achieve maximum efficiency.

A detailed description of the operation of the coded multiple frequency waveform generator shown in FIG. 2 will now be given. Cosine generator 30 may comprise a sinusoidal generator and phase shifter and produces $\cos 2\pi f_s t$ on line 32 and applies it to gate 34. The latter circuit 34 operates so as to generate the following signals at the denoted times:

$$\cos 2\pi f_s t \quad 0 \leq t \leq T$$
$$0 \quad \text{otherwise} \quad (3)$$

Hence, gate 34 opens to pass its input to amplitude modulator 38 only during the designated time. Function generator 67 applies the following amplitude modulation signal to input line 66 of ammplitude modulator 38:

$$a(t) = (\cos 2\pi t/T)^2 \quad (4)$$

Amplitude modulator 38 mixes the signals generated by gate 34 and function generator 67, and produces the following:

$$a(t)\cos 2\pi f_s t \quad 0 \leq t \leq T$$
$$0 \quad \text{otherwise} \quad (5)$$

Function generator 69 applies phase modulation signal, $\theta(t)$, to input line 68 of phase modulator 42. The latter circuit 42 mixes the signals produced by function genator 69 and amplitude modulation 38 to generate the following waveform:

$$a(t)\cos[2\pi f_s t + \theta(t)] \quad \text{for } 0 \leq t \leq T \quad (6)$$

This waveform is then transferred to phase shifters 46, 48, and 50. Although only three phase shifters are shown, it should be appreciated that this is merely illustrative, and the actual number is equivalent to the value of N. The output produced by phase shifter 46 is:

$$a(t)\cos[2\pi f_s t + \theta(t) + \theta_1] \text{ for } 0 \leq t \leq T$$

Similarly, the output of phase shifter 48 is:

$$a(t)\cos[2\pi f_s t + \theta(t) + \theta_2] \text{ for } 0 \leq t \leq T \quad (7)$$

Accordingly, the output generated by phase shifter 50 is:

$$a(t)\cos[2\pi f_s t + \theta(t) + \theta_N] \text{ for } 0 \leq t \leq T \quad (8)$$

The outputs produced by phase shifter 46, phase shifter 48, and phase shifter 50, respectively, are applied to upper sideband modulator 52, upper sideband modulator 54, and upper sideband moudlator 56, respectively.

Function generator 71 applies frequency $f_e + f_1$ to upper sideband modulator 52. Thus, upper sideband modulator 52 mixes the outputs of phase shifter 46 and function generator 71 to produce the following:

$$a(t)\cos[2\pi f_0 t + 2\pi f_1 t + \theta(t) + \theta_1] \text{ for } 0 \leq t \leq T \quad (9)$$

Also, function generator 73 transfers $f_e + f_2$ to upper sideband modulator 54 which mixes the outputs of phase shifter 48 and function generator 73 in order to generate the following:

$$a(t)\cos[2\pi f_0 t + 2\pi f_1 t + \theta(t) + \theta_2] \text{ for } 0 \leq t \leq (T) \quad (10)$$

Similarly, function generator 75 applies $f_e + f_N$ to upper sideband modulator 56. The latter circuit 56 mixes the outputs of phase shifter 50 and function generator 75 to produce the following:

$$a(t)\cos[2\pi f_0 t + 2\pi f_N t + \theta(t) + \theta_N] \text{ for } 0 \leq t \leq T \quad (11)$$

At all times other than those designated, upper sideband modulators 52, 54, and 56 geneate no output. Summer 58 then adds the outputs of upper sideband modulators 52, 54, and 56 to produce the waveform described by the aforementioned equation (2):

$$s(t) = a(t) \sum_{i=1}^{N} \cos(2\pi f_0 t + 2\pi f_i t + \theta(t) + \theta_i)$$

for $0 \leq t \leq T$
$s(t) = 0$ otherwise $\quad (12)$

The output of summer 58 is next transferred to power amplifier 62 which, as was mentioned previously, operates linearly.

A few examples of codings for the coded multiple frequency signal will now be given; however, it should be appreciated that other codings may be used. The following examples are illustrative of cases were the spacing between pulses is comparatively wide. Let $\Delta f_{min}$ be the minimum spacing between pulses; $V_{cm}$ be the maximum doppler shift of the clutter relative to the target; and, $V_{tm}$ be the maximum doppler shift expected from the target. For best performance, usually $\Delta f_{min}$ is chosen to be larger than $V_{cm}$ and $V_{tm}$. If $\Delta f_{min} \geq V_{cm}$ and $V_{tm}$, and furthermore $V_{cm}$ or $V_{tm}$ is greater than $3/T$ where T is the duration of each radio-frequency pulse, then this is the wide spacing coding case.

Figure 4:
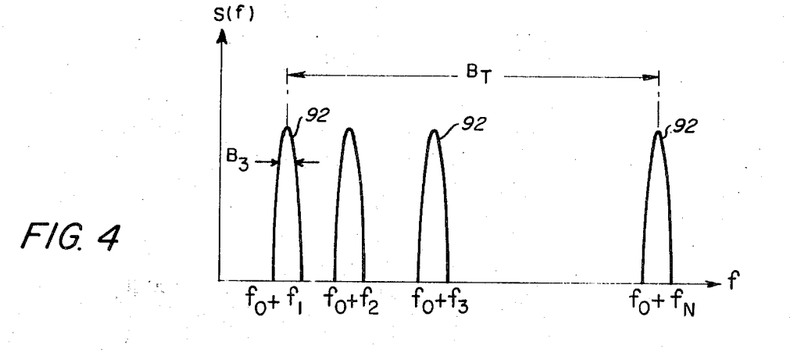
FIG. 4 is a waveform diagram of the magnitude of the Fourier spectrum of a signal having wide spacing.

FIG. 4 shows the magnitude of the Fourier spectrum of a signal for a wide spacing case. Hence, it is apparent that the Fourier Spectrum of the signal consists of a train of nonuniformly spaced pulses 92. The width of each pulse 92 shown is approximately equal to one over the duration of each radio-frequency pulse. In order for the signal to provide good cluttr rejection, the pulses are designed to have a very low skirt level. In other words, the spectrum of the signal in the region between the end of the base of one pulse and the beginning of the next is very low. A low skirt level can be obtained by selectively choosing a desirable amplitude and phase modulation. One possible choice is $a(t) = [\cos(\pi t/T)]^2$ for $-T/2 \leq t \leq T/2$
$= 0$ otherwise and $$\theta(t) = 0 \quad (13)$$

Figure 5:
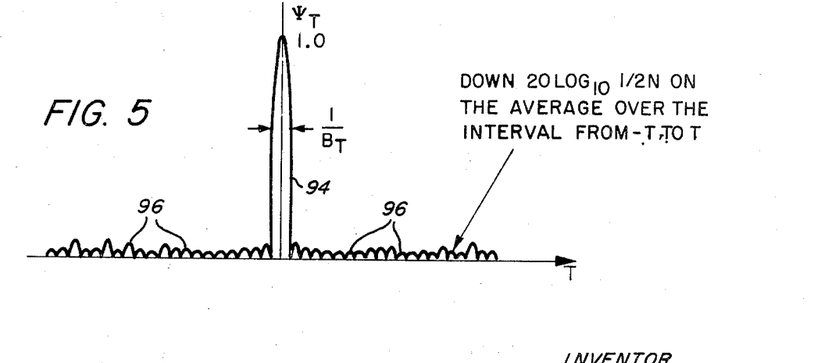
FIG. 5 is a waveform diagram of the autocorrelation function of a signal.

For the wide spacing case, the only requirement on the coding of the frequencies is that they be selected so that there are no range ambiguities. That is, the autocorrelation function of equation 2 consists of a single pulse 94 of width $1/F_t$ that is centered at the origin where $B_T = F_N - f_1$, and is low elsewhere 96. Hence, the autocorrelation function appears as shown in FIG. 5 and is defined as $$\psi(\tau) = \int_{-\infty}^{\infty} s(t) \, s(t+\tau) dt \quad (14)$$

Many frequency codings can give the above type of autocorrelation function. Two examples will now be given.

The Fourier spectrum of a coded multiple frequency signal having a first coding has the $f_{n_1}$ pulse at the center of the signal frequency band. The next pulse at its right is separated from it by $\Delta f_{min}$. The first pulse at its left is $\Delta f_{min} + \Delta$ away. The second pulse at the right is separated from the first pulse at the right by $\Delta f_{min} + 2\Delta$. The second pulse at the left is separated from the first pulse at the left by $\Delta f_{min} + 3\Delta$. This sequence continues for the rest of the pulses. The following equations describe this first coding:

$$f_{n_1} + n = f_{n_1} + n(\Delta f_{min}) + \sum_{i=1}^{n} 2(i-1)(\epsilon B_p)$$

for $n_2 \geq n \geq 1$ $$f_{n_1} + n = f_{n_1} - |n|(\Delta f_{min}) - \sum_{i=1}^{n} (2i-1)(\epsilon B_p)$$

for $-n_1 + 1 \leq n \leq -1$ where $\epsilon B_p = \Delta$, $n$ is an integer, and $\epsilon$ is a positive number, usually between 0.1 and 1, $n_1 = N/2$ and $n_2 = n_1$ for $N$ even
$n_1 = (N+1)/2$ and $n_2 = n_1 - 1$ for $N$ odd
$B_p = 1/T$ (15)

A typical example of this first coding has the following values:

$N = 150$
$\Delta f_{min} = 0.09$ mc
$\epsilon = 0.165$
$T = 300 \, \mu s$

The Fourier spectrum of a coded multiple-frequency signal having a second coding starts with the $f_1$ pulse and continues as follows. The next pulse is located to the right at a distance equals to $\Delta f_{min}$. The second pulse at the right is located at a distance of $\Delta f_{min} + \Delta$ from the first, while the third pulse at the right is located $\Delta f_{min} + 2\Delta$ from the second pulse. This sequence continues for the rest of the pulses The equation for this coding is as follows:

$$f_n = (n-1)\Delta f_{min} + \sum_{i=1}^{n-1} (i-1)(\epsilon B_p)$$

for $N \geq n \geq 1$ (16)

The frequency spacings up to now have been referred to as wide spacing cases; however, compact spacing is also possible. In this case, the pulses are spaced as closely as possible without causing more than two or three pulses to overlap when $f_D > B_3$, $f_D$ is doppler frequency, and $B_3$ is the 3 db bandwidth of each frequency pulse. Two pulses are taken to overlap if the distance between them is less than $B_3$. Additionally, it would also be possible to combine wide and compact spacing codings.

Figure 3:
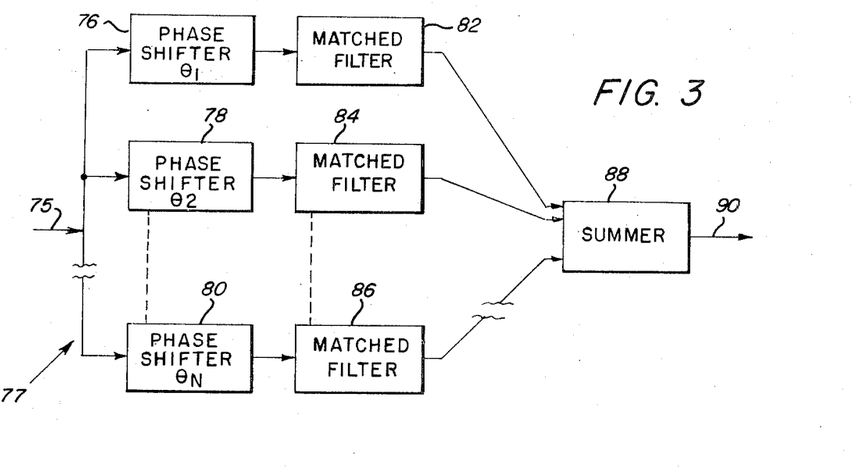
FIG. 3 is a block diagram of a coded multiple frequency waveform receiver.

The coded multiple frequency waveform receiver for one doppler frequency is depicted in FIG. 3 and comprises phase shifters 76, 78, and 80 connected in parallel; matched filter 82 connected to phase shifter 76; matched filter 84 connected to phase shifter 78; matched filter 86 connected to phase shifter 80; and, summer 88 connected to matched filters 82, 84, and 86. It should be appreciated, however, that a bank of R circuits such as is shown in FIG. 2 would be necessary to cover the whole doppler band.

Phase shifter 76 shifts the phase of an input signal received on line 75 by $-\theta_1$. Similarly, phase shifter 78 shifts the phase by $-\theta_2$, and phase shifter 80 shifts the phase by $-\theta_N$. Each matched filter 82, 84, and 86 comprises three resistor-inductor-capacitor parallel circuits which are synchronously tuned and have different transfer characteristics. These matched filters 82, 84, and 86 could comprise filters having frequency transfer characteristics which are the complex conjugate of the characteristics of the signal frequency pulses, but such filters are difficult to implement. The use of three resistor-inductor-capacitor parallel circuits provides the desired high clutter rejection and is easy to implement.

The frequency transfer characteristic of matched filter 82 is equal to the following:

$$\frac{1}{\left[1 + j\frac{2(f - f_c)}{B}\right]^3} \quad (17)$$

where $f_c = r(B/2) + f_1 + f_o$. Additionally, the frequency transfer characteristic of matched filter 84 is equal to the same equation, but $f_c = r(B/2) + f_2 + f_o$. Similarly, the frequency transfer characteristic of matched filter 86 has the same equation as given above, but $f_c = r(B/2) + f_N + f_o$. $B = 3.3 B_3$.

The outputs of matched filters 82, 84, and 86 are summed in summer 88, which generates a signal on line 90 at a time proportional to range and showing that the received signal has an r doppler frequency. Hence, any well-known range and doppler estimators may be connected to summer 88. It should be noted that there are N phase shifters 76, 78 and 80 and N matched filters 82, 84, and 86 because each signal comprises N pulses.

A few possible variations of the coded multiple frequency signal will now be discussed. In one case, each tone is chirped by varying $\theta(t)$ instead of having it be a constant. Accordingly, function generator 69 applies a variable to phase modulator 42. The chirping for each tone may be identical or they could be different. For instance, some tones could be chirped upward, and some tones could be chirped downward at the same time.

Figure 6:
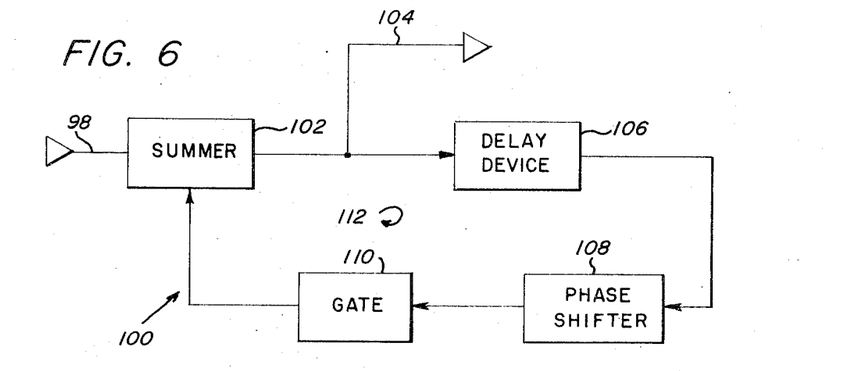
FIG. 6 is a block diagram of part of a burst-to-burst coded multiple frequency signal receiver.

In a burst-to-burst coded multiple frequency case, a train of M coded mutliple frequency signals are transmitted, with each signal being transmitted in a different burst period by the apparatus of FIG. 2. The spacings between the bursts may be either equal or unequal. The minimum spacing between bursts is usually larger than the round-trip distance for the maximum range which is to be detected unambiguously. The equation for a train of M bursts is as follows:

$$S_T(t) = \sum_{j=1}^{M} C_j a(t - T_j) \sum_{i=1}^{N} \cos [2\pi f_0 t + 2\pi f_i t + \theta(t - T_j) + \theta_1] \quad (18)$$

where $T_j$ is the transmission time for the jth burst, and $C_j$ is the weighting applied to the jth burst. Such weighting provides additional control on the clutter rejection characteristics of the signal. The train of bursts is processed coherently in the burst-to-burst coded multiple frequency signal receiver shown in FIG. 6.

Figure 8:
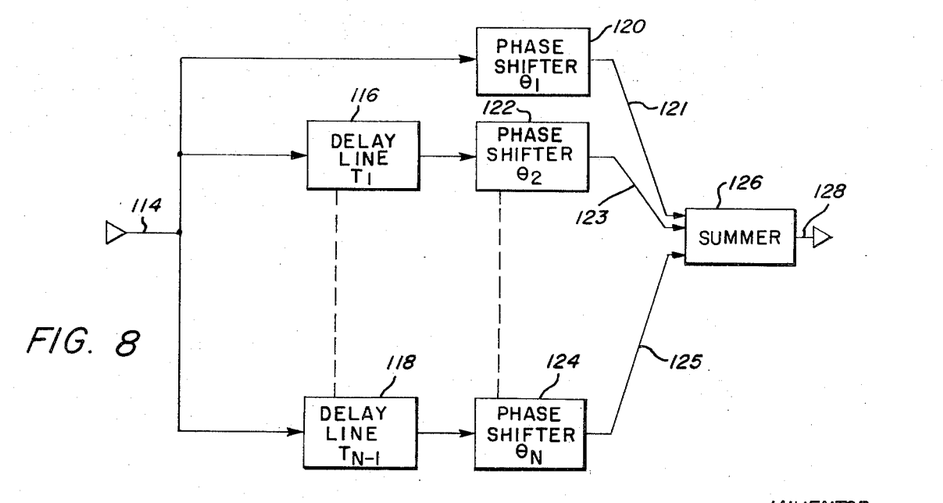
FIG. 8 is a block diagram of part of a sequential coded multiple frequency coded signal receiver.

In the case of equal spacings between bursts, the apparatus of FIG. 3 for a single burst is either preceded or followed by a single loop feedback delay line circuit depicted in FIG. 6; however, for unequal spacing, the apparatus of FIG. 8 would be used instead of that shown in FIG. 6. The delay of this feedback circuit 100 is equal to the burst-to-burst time, $T_B$ and is provided by delay device 106.

Single loop feedback delay line circuit 100 shown in FIG. 6 comprises summer 102 connected to delay device 106 and gate 110, and phase shifter 108 which is connected between delay device 106 and gate 110. As was mentioned previously, the delay of feedback circuit 100 is afforded by delay device 106 and is equal to the burst-to-burst time, $T_B$. The gain of loop 112 is unity. Phase shifter 108 has a fixed phase shift and is adjusted to give in phase addition of the train of return bursts. The particular phase used is dependent on the doppler shift of the return echo which is desired to be looked at. Accordingly, there are r single loop feedback delay line circuits 100, or one for each doppler frequency of the doppler frequency band. Gate 110 closes at $t = 0$ and opens at $t = MT_B$. It reamins open for $2 T_B$ before recycling. The output of single loop feedback delay line circuit 100 is taken from summer 102 via output line 104.

The radio-frequency pulses are not transmitted simultaneously in order for the apparatus of FIG. 2 to produce a sequential coded multiple frequency coded signal. Moreover, on the first, second, etc. transmissions, the radio-frequency pulses having carrier frequency $f_0$ plus, respectively, $f_1''$, $f_2''$, .... $f_N''$ are transmitted, and the sequence of frequencies $f_1''$, $f_2''$, .... $f_N''$ are a pseudo-random permutation of the sequence of frequencies $f_1, f_2, \ldots f_N$. In other words, the frequencies are in random order. The equation for the sequential coded multiple frequency coded signal is as follows:

$$s(t) = \sum_{i=1}^{N} a(t - T_i) \cos [2\pi f_0 t + 2\pi f_i'' t + \theta_i(t - T_i) + \theta_i] \quad (19)$$

Figure 7:
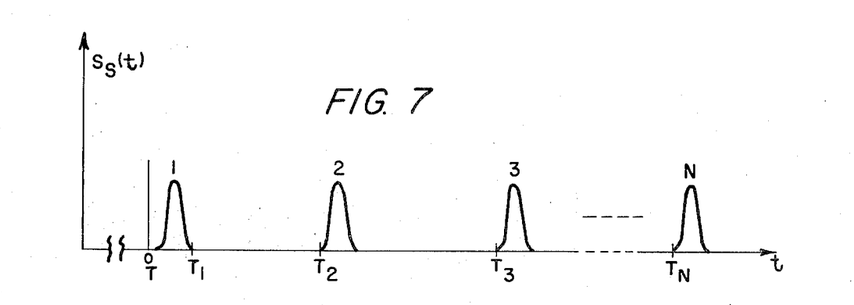
FIG. 7 is a waveform diagram of the carrier of a sequential coded multiple frequency coded signal.

The spacings between the transmission of the radio-frequency pulses may be either equal or unequal. In the above equation, the selection of values for $f_i''t$ provides the spacing between frequencies, and the selection of values for $T_i$ provides the spacing between pulses. FIG. 7 shows the envelope of the carrier of a sequential coded multiple frequency coded signal.

For the sequential coded multiple frequency coded signal receiving means, the matched filter for a single burst of a coded multiple frequency signal which is shown in FIG. 3 is either preceded or followed by the delay apparatus depicted in FIG. 8. The latter comprises an input line 114 connected in common to delay line 116, delay line 118, and phase shifter 120. Phase shifter 122 is connected to delay line 116, and phase shifter 124 is connected to delay line 118. Summer 126 is connected to output line 121 of phase shifter 120, output line 123 of phase shifter 122, and output line 125 of phase shifter 124. Although only two delay lines 116 and 118 are shown, it should be appreciated that there are N − 1. Similarly, although only three phase shifters 120, 122 and 124 are shown, there are acutally N. The delays provided by delay lines 116 and 118 are selectively chosen so that the burst pulses received on different transmissions are time coincident when the last pulse burst of the signal arrives. Phase shifters 120, 122, and 124 are adjusted to provide in phase addition of the signal burst pulses. In many cases the bandwidth requirements of delay lines 116 and 118 are such as to allow the use of magnetostrictive delay lines. The outputs of phase shifters 120, 122, and 124 are added in summer 126.

As was mentioned previously, a coded multiple frequency waveform receiver for one doppler frequency is shown in FIG. 3 and includes a plurality of matched filters 82, 84, and 86. In order to process for the example cited just after equation 15 a 50 kcps Doppler frequency band, a bank of the plurality of filters shown in FIG. 3 is required with each covering a different 5.5 kcps of the band. A simpler implementation is shown in FIG. 9 and comprises six well-known coherent memory filters 136, 138, and 140 selectively connected to six trapped delay lines 148, 150, and 152.

A coherent memory filter is capable of performing the processing of a plurality of filters, and thus any plurality of filters in a bank can be synthesized by a coherent memory filter. The coherent memory filter provides the output of the synthesized group of filters at sampled instances. The sampling rate is given by the loop delay of a coherent memory filter. In order for the coherent memory filter to cover a doppler band of 50 kcps, which is the Doppler band for a single tone of a coded multiple frequency signal, the loop delay thereof must be 20 microseconds. For this case, the coherent memory filter provides the output of the synthesized group of filters every 20 microseconds. The outputs of the different filters in the group that would be observed at one sampling instant are provided in real-time in the 20 microsecond time interval between sampling. The amplitude and phase of the output at time $t_j$ corresponds to the amplitude and phase of a filter set at some frequency $f_j$. Moreover, the output just after the sampling corresponds to the output for zero doppler shift, and the output 20 microseconds later corresponds to the output of a filter centered 50 kcps away with the time for outputs of filters in between these frequencies being obtained by assuming a linear frequency-time scale. The output filters centered at all frequencies in the band from 0 to 50 kcps can be synthesized by the apparatus of FIG. 9; hence, it synthesizes the output of a continuum of filters covering the designated band. The fact that the output is synthesized only at sampling intervals does not represent a loss of information since the bandwidth of the output voltage of the filters synthesized is much less than one over the sampling period.

By the use of time multiplexing, more than one group of filters each covering a separate band of frequencies, 50 kcps, can be synthesized in one circulating memory filter system. This is the case depicted in FIG. 9. In a time multiplexed system, the coherent memory filter loop delay required is still 20 microseconds in order to cover the 50 kcps band for each filter group synthesized. The time between samples is again 20 microseconds. Furthermore, the outputs corresponding to a given sampling instant are provided in a 20 microsecond time interval as before. Assume that 25 banks of filters are multiplexed into one coherent memory filter. Then the output for one of the banks of filters synthesized are given in a time interval equal to 0.8 microseconds, the 20 microsecond interval being divided up into 25 0.8 microsecond intervals with each of these intervals providing the output of a different bank of filters. A single coherent memory filter may thus be used to multiplex 25 filter banks. Hence, one coherent memory filter can coherently integrate 25 of the tones of the received signal. Accordingly, six coherent memory filters 136, 138, and 140 can cover the total doppler band of interest.

Figure 9:
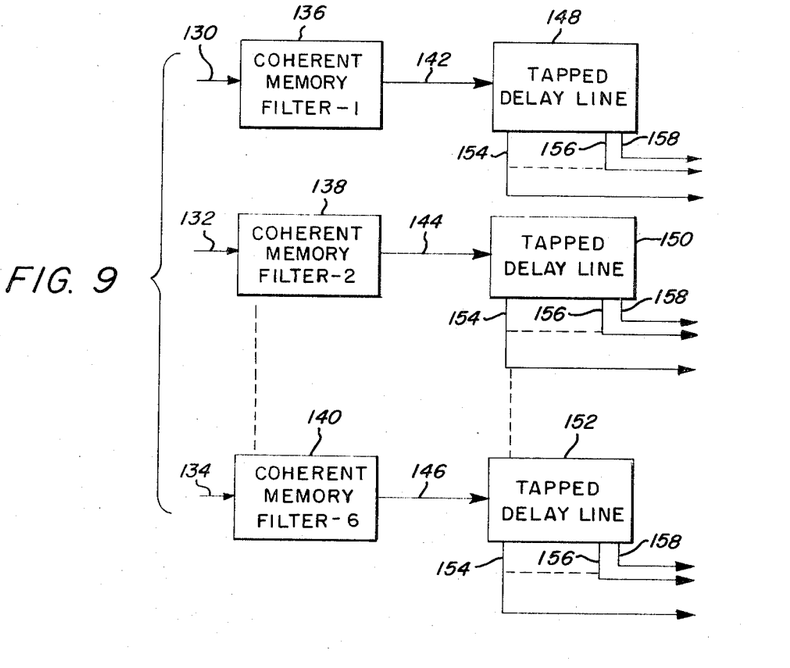
FIG. 9 is a block diagram of an alternative embodiment for part of the coded multiple frequency signal receiver.

In order to synthesize the outputs of the bank of filters matched to the coded multiple frequency signal from the previous coherent memory filter outputs, it is necessary to form the outputs of the synthesized bank of filters described previously between samplings and then to appropriately add the outputs of these filters as shown in FIG. 9.

Each coherent memory filter 136, 138, and 140 synthesizes 25 different filter banks, and the outputs therefrom are made time coincident by the use of tapped delay lines 148, 150 and 152. Each tapped delay line 148, 150, and 152 has a total delay of 25 microseconds and taps every 0.8 microsecond. As a result of these delay lines 148, 150, and 152, the outputs of 150 synthesized filter banks are displayed simultaneously in the last 0.8 microsecond interval occurring before the beginning of the next 20 microsecond sampling interval. Consider the coherent memory filter output in this last 0.8 microsecond interval corresponding to the output of the filter bank covering the doppler band for the jth tone. Moreover, let the output at time $t_i$ in this interval correspond to the output of a filter tuned to a frequency which is doppler shifted relative to the frequency of the transmitted jth tone. The amplitude and phase of the output for the jth bank at time $t_i$ is designated by the complex number $E_{ij}$. The quantity $E_{ij}$ represents the amplitude and phase of the output of the ith synthesized filter in the jth filter bank observed at the beginning of the 20 microsecond sampling instant.

The ability of a radar system using the coded multiple frequency signal waveform to give high clutter rejection arises from the fact that a receiver matched filter designed for a particular Doppler frequency will give very low output for return signals which do not have the doppler frequency for which the filter is designed. Furthermore, if the signal has the Doppler frequency for which the matched filter is tuned, the output will have only one major peak, and the time of the appearance of this peak indicates the range of the target from which the return was reflected. These properties also permit the system to provide unambiguous range and velocity information. The matched filter for systems using other waveforms will also provide low output for the return signals having Doppler shifts other than the one for which the matched filter is tuned; however, the matched filter for a coded multiple frequency signal gives a much lower output when the Doppler shift of the return signal is not that to which the matched filter is tuned while still providing unambiguous range and Doppler data.

It shall first be shown that the output of only one matched filter peaks at one time for a signal having a doppler shift for which the matched filter is tuned.

Recall that the output of a filter is given by $$e_0(t) = \int_{-\infty}^{\infty} H(f)S(f)e^{j2\pi ft}df \qquad (19)$$

where $H(f)$ is the frequency transfer characteristic of the filter, and $S(f)$ is the Fourier spectrum of the input signal. For a matched filter, it is well known that the frequency transfer characteristic of the filter is given by the complex conjugate of the Fourier spectrum of the signal, that is, $$H(f) = S^*(f) \qquad (20)$$

where the * stands for "complex convolution of". Substituting (20) and (19) gives $$e_0(t) = \int_{-\infty}^{\infty} |S(f)|^2 e^{j2\pi ft}df \qquad (21)$$

that is, the output is given by the inverse Fourier transform of the magnitude squared of the signal Fourier spectrum. But the magnitude squared of the signal Fourier spectrum is a train of nonuniformly spaced pulses in the frequency domain. The inverse Fourier transform of a train of nonuniformly spaced pulses in the frequency domain consists of a time function having a single peak at the origin of width $1/B_T$ where $B_T$ is the separation between the first and last pulses, and low sidelobe levels on either side of this main peak. Moreover, a plot of the output is identical to the autocorrelation function of the signal given by FIG. 5. One can readily see that the output is given by the autocorrelation function of the input signal by recalling that the output of the filter can be written also as $$e_0(t) = \int_{-\infty}^{\infty} s(\lambda)h(t+T-\lambda)d\lambda \qquad (22)$$

where $h(t)$ is the impulsive response of the filter and $s(t)$ is the input signal. For a matched filter $$h(T - \lambda) = s(\lambda) \qquad (23)$$

substituting 23 in 22 thus gives $$e_o(t) = \int s(\lambda) s(\lambda + t) d\lambda = \phi(t) \qquad (24)$$

Now consider the case where the doppler shift of the signal, $\gamma$, is not equal to that for which the matched filter is tuned. For simplicity and without loss of generality, assume that the matched filter is tuned to a doppler shift of zero. The Fourier spectrum of a doppler shifted signal is now given by $S(f - \gamma)$ and 21 becomes $$e_o(t) = \int S(f - \gamma) S^*(f) e^{j 2 \pi f t} df \qquad (25)$$

Figure 10A:
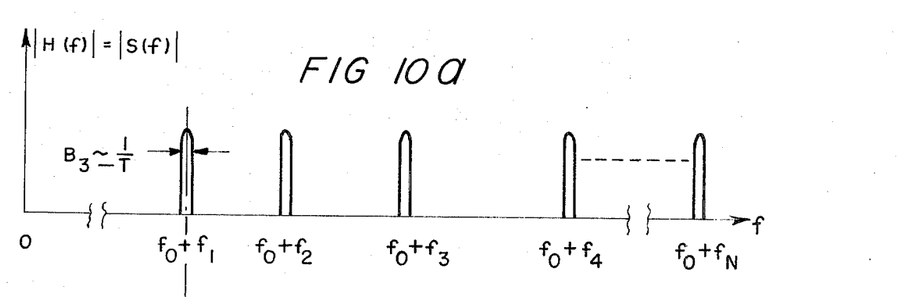
FIG. 10a is a waveform diagram of the transfer characteristics for a matched filter; and, FIG. 10b is a waveform diagram of the spectrum of the doppler shifted return.
Figure 10B:
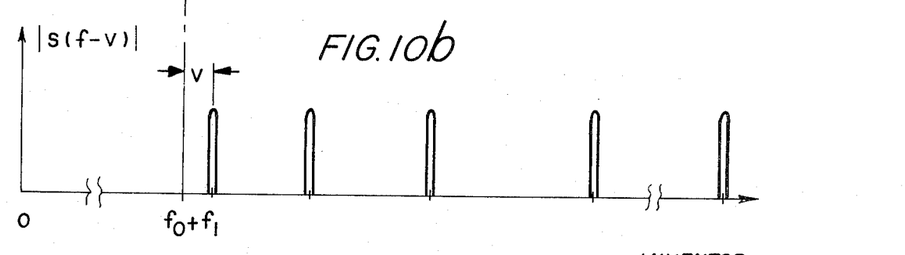

It follows that $$e_0(t) \leq \int_{-\infty}^{\infty} |S(f-\gamma)||S(f)| df \qquad (26)$$

where the bars stand for "magnitude of". FIGS. 10a and 10b show a plot of $|S(f-\gamma)|$ and $|S(f)|$. FIG. 10a shows the magnitude of the transfer characteristics for a matched filter, while FIG. 10b shows the magnitude of the spectrum of the doppler shifted return. The plots are given for $\Delta f_{min} - B_3 \geq \gamma \geq B_3$ where $B_3$ is the 3 db bandwidth of the pulses in the frequency domain and $2 B_3$ is assumed to be the approximate width of the base of the frequency pulses. It is apparent from the plots that the integrand of 26, $|S(f-\gamma)| |S(f)|$, is approximately zero for $\Delta f_{min} - B_3 \geq |\gamma| \geq B_3$ which is repeated again. Hence, the output is small when the doppler frequency of the return signal is not the same as that to which the received matched filter is tuned.

Thus it follows from the above that the response of a filter matched to a target having a doppler frequency shift $\gamma_1$ will not respond to the return from a clutter scatterer having a doppler frequency shift $\gamma_2$ where $\Delta f_{min} - B_3 \geq |\gamma_2 - \gamma_1| \geq B_3$ Furthermore, if the doppler frequency shift introduced by the clutter scatterer is equal to that of the target doppler shift, but the range of the clutter scatterer is not equal to that of the target, then for the clutter scatterer return the response of the matched filter tuned to the target doppler shift when observed at the time that the output would peak for the return from the target will be attenuated by about $20 \log_{10} 1/\sqrt{2N}$.

Assume, for example, that the target is located at a range $R_o$ and that the clutter scatterers extend from a range $R_o$ to $R_1$ beyond the target and from $R_o$ to $R_2$ in front of the target, where the range intervals $R_1 - R_o$ and $R_o - R_2$ are greater than the signal duration. Furthermore, assume that the clutter scatterers are uniformly distributed over the above range intervals. In addition, assume that in any one range interval the clutter scatterers introduce doppler shifts ranging from $\gamma = \gamma_{max}$ to $\gamma = \gamma_{max}$ where $\gamma$ represents doppler shift measured relative to the target doppler shift. It is also assumed that the distribution of possible doppler shifts are uniformly distributed over the above interval. For these assumptions, the power signal-to-clutter-plus-noise ratio at the output of the matched filter tuned to the target signal will be the highest possible.

A radar system which processes coded multiple frequency signals has many advantages over prior art systems. For example, such a system has a higher clutter rejection capability than a standard continuous wave radar system. In particular, it is $10 \log_{10} N$ times better, where $N$ is equal to the number of tones or pulses which are transmitted. Additionally, it provides unambiguous range and velocity measurements. Furthermore, such a system does not require a linear phase characteristic in the transmitter or receiver. It is possible to increase the system bandwidth while not increasing the system complexity if N remains fixed, while at the same time the clutter rejection is not degraded. A system which processess the burst-to-burst coded multiple frequency signal provides $10 \log_{10} M$ db. more clutter rejection than does one using the basic coded multiple frequency signal, and has the other advantages enumerated above. The advantages of a system which processes the sequential coded multiple frequency signal are the same as those for a system using the basic coded multiple frequency signal; however, it has the additional advantage of higher doppler resolution for the case of equal spacings between bursts.

Although a preferred embodiment of this invention has been described with reference to a pulse radar system, it should be appreciated that the invention is not limited to such a system. A system for processing coded multiple frequency waveforms such as are described herein, would be useful in fields such as television, radio, and telegraphy. Accordingly, this invention is limited only by the full scope of the following claims.

I claim:

1. A generator for producing coded multiple frequency signals comprising:
   a source of trigonometric function waveforms;
   an amplitude modulator coupled to said source;
   a phase modulator coupled to said amplitude modulator;
   a plurality of second means each coupled to said phase modulator for producing a plurality of pulses each having the same amplitude and phase modulation and a different carrier frequency such that the Fourier spectrum of the carrier frequencies of said pulses have different spacings; and,
   summer means coupled to said plurality of second means for superimposing said pulses to produce a coded multiple frequency signal.

2. The invention according to claim 1 and wherein: said source of trigonometric function waveforms comprises a cosine generator.

3. The invention according to claim 1 and wherein: each of said second means comprises an upper sideband modulator.

4. The invention according to claim 1 and wherein: power amplifier means are coupled to said summer means.

5. The invention according to claim 1 and wherein: a plurality of phase shifters are coupled to said second means, each of said phase shifters producing a different phase shift.

6. A doppler radar system comprising:
   a transmitting means for target illumination using simultaneously coded multiple frequency signals in which each of the signals is supported on a different carrier frequency, the frequency difference between any two carrier frequencies being unequal to the frequency difference between any other two carrier frequencies; and a receiver comprising:
   a plurality of filter means each having a different frequency transfer characteristic and each being responsive to a different narrow band of frequencies of an incident echo signal for extracting a plurality of tones each representing a different doppler shift; and
   a summing network coupling the filter means for providing a signal indicative of range and doppler shift.

* * * * *